US006542623B1

(12) United States Patent
Kahn

(10) Patent No.: US 6,542,623 B1
(45) Date of Patent: Apr. 1, 2003

(54) PORTABLE BRAILLE COMPUTER DEVICE

(76) Inventor: Shmuel Kahn, Nahal Hayarkon 38, Beit Shemesh 99000 (IL)

( * ) Notice: Subject to any disclaimer, the term of this patent is extended or adjusted under 35 U.S.C. 154(b) by 0 days.

(21) Appl. No.: 09/391,610

(22) Filed: Sep. 7, 1999

(51) Int. Cl.⁷ ................................................. G06K 9/00
(52) U.S. Cl. ....................................... 382/114; 434/114
(58) Field of Search ................................. 382/103, 292, 382/114; 704/3, 9, 235, 270, 272, 275; 434/114, 113, 112

(56) References Cited

U.S. PATENT DOCUMENTS

| 5,627,578 A | * | 5/1997 | Weintraub | 347/101 |
| 6,042,009 A | * | 3/2000 | Barret et al. | 235/441 |
| 6,159,013 A | * | 12/2000 | Parienti | 434/114 |

\* cited by examiner

*Primary Examiner*—Jayanti K. Patel
*Assistant Examiner*—Seyed Azarian
(74) *Attorney, Agent, or Firm*—G. E. Ehrlich Ltd.

(57) ABSTRACT

A portable device for providing an information management system for blind individuals, including those who read Braille format writing, and who may either partially or completely lack sight capabilities, and/or who may be unable to process visual information obtained from printed character materials. The portable device features a scanner for scanning the printed material, software for interpreting and translating the printed material into Braille and a Braille array display for displaying the Braille. In addition, the portable device preferably features an annotation feature for adding notes to the text as well as for separate text entry, more preferably through a Braille keyboard. Other preferred components include an organizer component for providing calendar information, reminders and other useful functions for the management of information. A management component provides a software module for displaying menus for selecting functions, such that a Braille equivalent of a GUI (graphical user interface) is provided. Thus, the portable device of the present invention provides a complete information management solution for blind individuals.

16 Claims, 5 Drawing Sheets

PORTABLE BRAILLE COMPUTER DEVICE

FIELD AND BACKGROUND OF THE INVENTION

The present invention relates to a portable Braille computer device which is an automated translation device, and most particularly, to scanning and translating hand-written or printed text from a language to the Braille format, preferably in the same language.

The Braille format was devised to enable the blind or visually impaired to read alphanumeric characters using their sense of touch. Braille is represented as "cells" of dots raised above the surface of the reading material. Initially each Braille cell consisted of six dots, arranged in two columns of three dots each. Each character is identified by the specific set of dots that are raised in the cell. Because of the limited number of combinations possible in a six-dot cell (63), the cell has been expanded to eight dots, by adding two dots at the bottom, to form two columns of four dots.

Within the context of the Braille format, there are various forms of Braille writing. These forms differ in the varying levels of complexity of the contractions that they employ. Grade-1 Braille is the simplest. In this form of Braille, a character is used for all the letters of the alphabet. Only few if any of the most common words such as "and", "for" and "of", or character combinations such as "ch", "ou", "ow" and others are contracted. This form of Braille is used mostly to teach Braille, or for elementary level texts.

Other forms of Braille are more complex, in order to increase the amount of information which is imparted in a group of cells. For example, grade-2 Braille is a more complex, and much abbreviated form, with dozens of rules on how to contract different words. Most Braille publications use this form of Braille. Grade-3 Braille is the Braille equivalent of shorthand writing, as it relies very heavily on abbreviations. This form of Braille is the least standardized, and in many cases is more of a personal writing style of those that use it. Grade-3 Braille is therefore the most specialized form of Braille, used mostly by few people for advanced study or other such topics.

Braille writing itself can be formed on different types of media. The most prevalent form of Braille is printed material. Braille is printed using special printers that emboss the raised dots on sheets of paper or plastic. Before a text is printed in Braille it must be processed, as the "translation" is not letter for letter between the original written language and Braille, even for the simplest Grade-1 Braille. Because of the relatively large fixed size of Braille cells compared to regular text (a 3 to 1 ratio), the amount of information that a single page of Braille can hold is considerably smaller than a regular page of text. Therefore, Braille books tend to be large and cumbersome. Furthermore, the additional processing required to produce a Braille publication or to reproduce a regular publication in Braille format, as well as the extra size of the materials, increase the expense of producing these publications. This severely limits the scope of material available in Braille.

The availability of computers has resulted in the development of various tactile displays designed for readers of Braille. A tactile Braille display is a display which features electronic control mechanisms for lowering and raising of pins in single or multiple Braille cells, which are then read like printed Braille materials. Numerous mechanisms have been devised to create and control such dynamic displays of Braille writing. The most prevalent technologies utilized are magnetic pins or solenoids, as disclosed for example in U.S. Pat. Nos. 5,583,478 and 4,191,945; or constructions using piezo-electric crystals, as in U.S. Pat. Nos. 4,283,178 and 5,226,817. These mechanisms are rather expensive to manufacture and operate. They also have many prohibitive limitations, such as the size of the control mechanisms, in addition to the actual cell size; high power consumption; and the inability to display more than a single line of cells. This has severely limited the applications for which such tactile displays have been used. Recently a new mechanism for tactile Braille writing has been developed, which is disclosed in U.S. Pat. No. 4,871,992. This mechanism is much less expensive and can be arranged in multiple row configurations.

One common use for tactile Braille displays is in note-taking devices, as described for example in U.S. Pat. No. 4,694,494. Braille note-taking devices are usually small handheld devices which feature a Braille (or normal) keyboard, used to enter the notes, and a single row of one to twenty Braille cells. Such devices are a specific need of the blind, as unlike seeing people, the blind cannot access the printed information in the readily available non-Braille materials needed for many daily tasks. For this reason, they are forced to create their own notes in Braille. Many of these devices have various additional features such as appointment calendars, phone books and other features commonly seen in pocket organizers for sighted people. However, these note-taking devices cannot aid the blind individual in reading various printed materials, such as train schedules and other informational materials, which may be required as the blind individual travels or studies for example.

Despite these many advances in various devices for the blind, currently available Braille readers still have many disadvantages. These Braille "reading" machines are constructed by combining standard computer sub-systems. They generally consist of a personal computer, desktop scanner, and Braille display, or text to voice unit. Each of these sub-systems has a separate proprietary controlling software program, and these systems generally lack cohesion and the ability to interact with other such systems. Because of the nature of the components which are involved, these systems are large and bulky, and therefore are not portable. This is a major disadvantage, as many printed materials are not readily available in Braille format, the blind individual cannot easily read printed materials as necessary, for example when traveling. This presents a serious problem for blind individuals.

One attempt to provide such a portable scanning device is disclosed in German Patent No. DE 3901023. However, the device is not truly portable, as it requires a separate computer to perform the computational tasks required to scan printed text and display such text as Braille. The scanning portion of the device then communicates with the separate computer by radio, such that the blind individual still cannot travel with the device or otherwise easily transport the complete device. Thus, the disclosed device does not ameliorate the problem of portability.

However, no currently available device on the market for reading printed materials and translating them into Braille is portable. Therefore, blind individuals cannot easily read such printed materials as train schedules, material distributed in a classroom or other educational context for examination during a lecture, and other printed material which is most preferably read when traveling, studying, or otherwise when away from a large, bulky Braille reader. Furthermore, none of the currently available reading devices provides an annotation function, in order to allowing the blind individual to add notes to the translated material. Also, none of the currently available reading devices is able to represent graphic images with the Braille array, such that the blind individual is not able to read or otherwise obtain information from such graphic images. Yet a long-felt need for such a device exists.

There is thus a need for, and it would be useful to have, a device for reading printed material written in a printed character language and for rapidly translating the text of such material into Braille, which is truly portable.

BRIEF DESCRIPTION OF THE DRAWINGS

The foregoing and other objects, aspects and advantages will be better understood from the following detailed description of a preferred embodiment of the invention with reference to the drawings, wherein.

SUMMARY OF THE INVENTION

Figure 1:
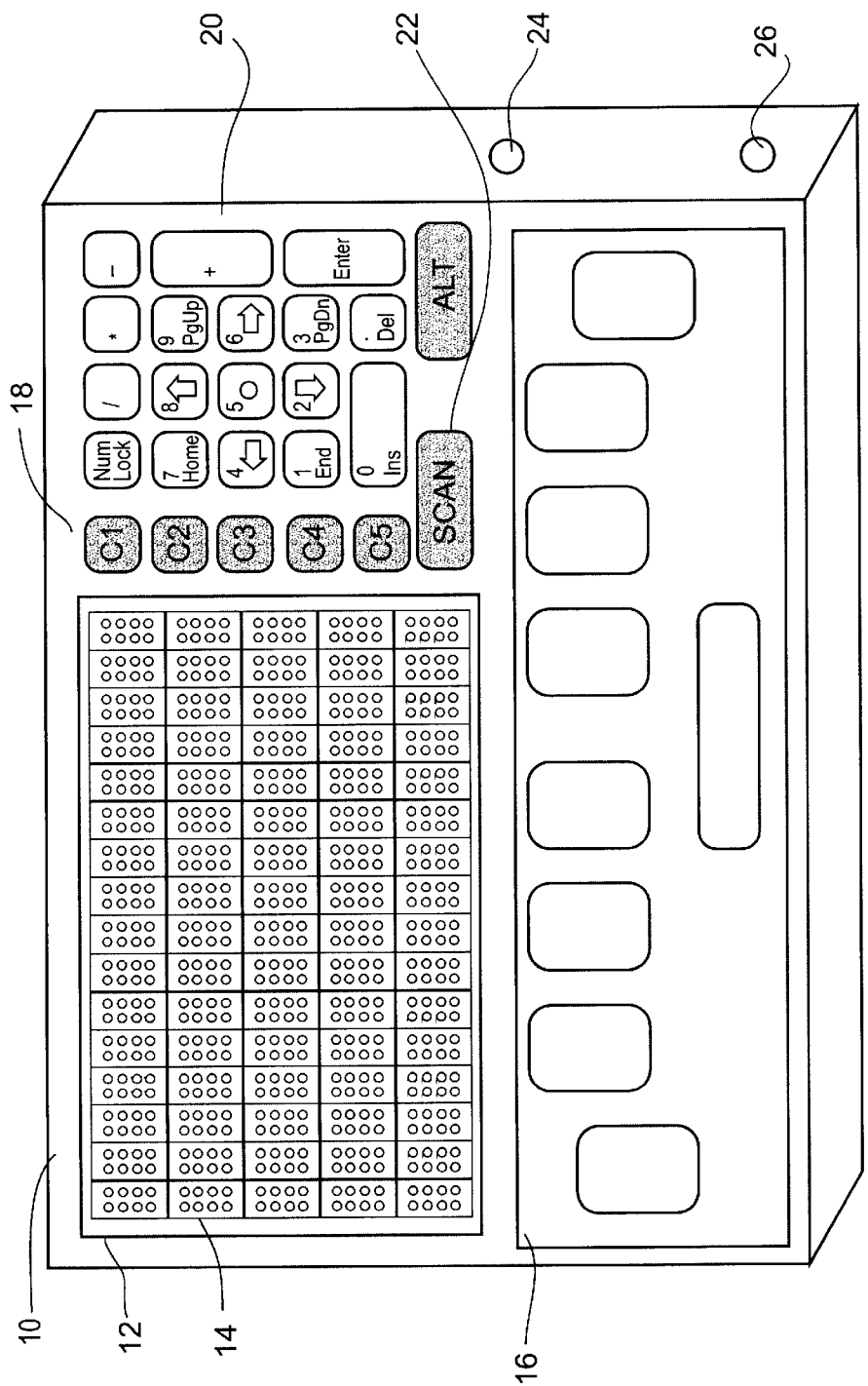
FIG. 1 is a diagram of the upper surface of the device according to the present invention.

The present invention is of a portable Braille computer device for scanning printed material written in a printed character language and for translating such material into Braille. The portable device combines a number of different functions for storing, retrieving and displaying information in a format which is readable by blind individuals, in the Braille format. Unlike background art devices which only provide a partial solution to the problem of information management for the blind, the device of the present invention provides a complete portable solution to information management for those who read and understand Braille, and as such represents a significant, inventive advance over the background art.

Preferably, the portable device features an annotation function, both for allowing the user to take notes separately, and more preferably for allowing the user to annotate the translated material with such notes, such that the user can then read the translated material with the annotations. The annotation function is preferably provided through a Braille keyboard. Also preferably, the portable device is able to scan graphics and to provide some type of representation of the graphic image, for example by outlining the image with the Braille array.

According to the present invention, there is provided a portable device for information management for a blind individual, comprising: (a) a portable scanner for scanning a printed character material and for producing digital data; (b) an OCR (optical character recognition) software module for analyzing the digital data to determine if the printed character material contains text, and if the text is present, converting at least a portion of the digital data into digital text, and for converting the digital text into Braille writing; (c) a Braille array, comprising a plurality of Braille cells, for displaying the Braille writing; and (d) a management software module for producing Braille writing for providing an information management selection interface to the blind individual, the information management selection interface being displayed on the Braille array, and the information management selection interface including at least one option for scanning the printed material.

Hereinafter, the phrase "printed character language" refers to printed materials in which the letters, numbers or other symbols are flat and not raised, and which specifically are not printed in Braille.

Hereinafter, the phrase "Braille array" refers to an array of Braille cells in a dynamic, electronically-controlled display, preferably such as that disclosed in U.S. Pat. No. 4,871,992.

Hereinafter, the term "multi-line tactile Braille display" refers to a Braille array with a plurality of rows of Braille cells.

DETAILED DESCRIPTION OF THE INVENTION

The present invention is of a portable device for providing an information management system for blind individuals. As used herein, the term "blind" refers to any individual who reads Braille format writing, and who may either partially or completely lack sight capabilities, and/or who may be unable to process visual information obtained from printed character materials. The portable device features a scanner for scanning the printed material, software for interpreting and translating the printed material into Braille and a Braille array display for displaying the Braille. In addition, the portable device preferably features an annotation feature for adding notes to the text as well as for separate text entry, more preferably through a Braille keyboard. Other preferred components include an organizer component for providing calendar information, reminders and other useful functions for the management of information. A management component provides a software module for displaying menus for selecting functions, such that a Braille equivalent of a GUI (graphical user interface) is provided. Thus, the portable device of the present invention provides a complete information management solution for blind individuals.

The principles and operation of a device according to the present invention may be better understood with reference to the drawings and the accompanying description, it being understood that these drawings are given for illustrative purposes only and are not meant to be limiting.

Referring now to the drawings, FIG. 1 is a diagram of an upper surface of the Braille device according to the present invention. The Braille device features a casing 10, which holds a Braille array 12. Braille array 12 is a grid of a plurality of Braille cells 14, arranged in a plurality of rows of such cells as shown. Braille array 12 is the tactile Braille display for the device of the present invention. The Braille representation of the scanned text is displayed as tactile Braille by Braille array 12.

Braille array 12 which is preferably affixed to upper surface 10 of the reading device has a reference surface which is preferably level with upper surface 10 of the device or slightly below. Braille array 12 is preferably composed of Braille cells of the type that can be arranged in multiple rows, such as that disclosed in U.S. Pat. No. 4,871,992. This type of Braille component has a controlling pin for each of the eight dots in the Braille cell. Each dot is controlled by setting a positive voltage to the controlling pin to raise it, and a negative voltage to lower the pin. For this reason the value that is to be displayed by each Braille component, can be represented using a single data byte, which has eight bits of data, which each can have a 0 or 1 value.

A simple control for this type of component is to map each component directly to a fixed address in memory, and then to write the value to be displayed to this address. This requires latch and decoder components for each of the Braille cells in Braille array 12. By mapping the components to consecutive memory addresses, the micro-controller (not shown, see FIG. 4) is able to display Braille text in Braille array 12 simply by writing the Braille representation of such text into memory. The hardware design of Braille array 12 preferably enables Braille array 12 to behave as if it was a single external memory component, where each individual Braille cell is mapped directly to a byte of data at a specific memory location. Braille array 12 preferably features an additional latch and decoder at the point of interface with the micro-controller. This additional decoder maps the entire range of addresses for writing to Braille array 12. The grid arrangement of Braille cells in Braille array 12 preferably enables the device of the present invention to display a larger amount of text, in a limited area. Such a large display increases the ease of reading the text, and provides a larger contextual reference to the reader.

According to a preferred embodiment of the present invention, as described in greater detail below, Braille array 12 is able display tactile graphics, since the Braille components themselves are simply tactile representations of a plurality of separate points. As such, Braille array 12 is not limited to the representation of Braille writing itself.

In addition, casing 10 features a Braille keyboard 16, preferably with additional control keys 18. Braille keyboard 16 is preferably used to enter annotations on the text being viewed, or alternatively for entering other types of textual information. Additionally, Braille keyboard 16 and control keys 18 are preferably used to perform various operations such as controlling which portion of scanned text is currently displayed (previously scanned and viewed text, or text not yet displayed), adding bookmarks to the text, recalling previously entered annotations and bookmarked texts, and to operate organizer related functions. The keyboard buttons of Braille keyboard 16 are preferably used to perform control operations by simultaneously pressing an additional control key 18. Additional control key 18 allows the key's alternate functionality to be used, in a fashion similar to the <Alt> and <Control> keys on standard computer systems.

As shown, Braille keyboard 16 is preferably an eight key keyboard for enabling the user to enter annotations on the text being viewed, or any other textual information that is unrelated to the viewed text. Control keys 18 preferably are used to select various control operations such as adding bookmarks to the text, thereby enabling the user to easily return to the current position in the viewed text, recalling previously entered annotations and bookmarked texts, and operating organizer related functions. The keys of Braille keyboard 16 are preferably used to select control operations by simultaneously pressing additional control key(s) 18. When one or more control keys 18 are pressed for activating the alternate functionalities, the set of available options are preferably displayed on Braille array 12, as very-short text descriptions. This format is analogous to pull-down menu options in software systems for sighted individuals. The first letter in each description identifies the key, or key combination, of Braille keyboard 30 which must be pressed, in order to activate the specific option. Because of the limited number of keys, and the limited display area of Braille array 12 to describe them, these "menus" of options are optionally and preferably nested, such that selecting a basic menu option preferably causes another menu of additional more specific options to be displayed. The user preferably has a control option to determine what type, if any, of description is displayed for the menu options. These descriptions may optionally range from detailed descriptions to be used by new users of the device, to no text descriptions at all for the most experienced users.

Numeric keypad 20 (similar to the standard keyboard component), preferably contains standard cursor keys to control the movement of the cursor within the text. An Up key and a Down key preferably cause the text to scroll one line at a time. A Left (Back) key and a Right (Forward) key preferably move the cursor one character backwards or forward. A Page-Up key and a Page-down key preferably scroll the entire display back (to display previously viewed text) or forward (to display more recently or just scanned text). Home and End keys to move the cursor to the beginning or end of the viewed text. A central key preferably redisplays the last referenced text (before any directional keys were recently used). This would be the text last scanned when reading new text or the beginning of a previously bookmarked text or of a user entered annotation, for example. The cursor will preferably be noted by continually raising and lowering all or some of the pins in the specific Braille cell.

In addition, the device casing 10 preferably features an external device connector 24 for permitting the device to send data to, and to receive data from, an external device such as a computer or to a separate tactile display with a considerably larger viewing area, or a Braille printer for example. Device casing 10 preferably also features an external power connector 26, for connection to an electrical outlet for example, although the device is preferably battery-powered as described in greater detail below.

Figure 2:
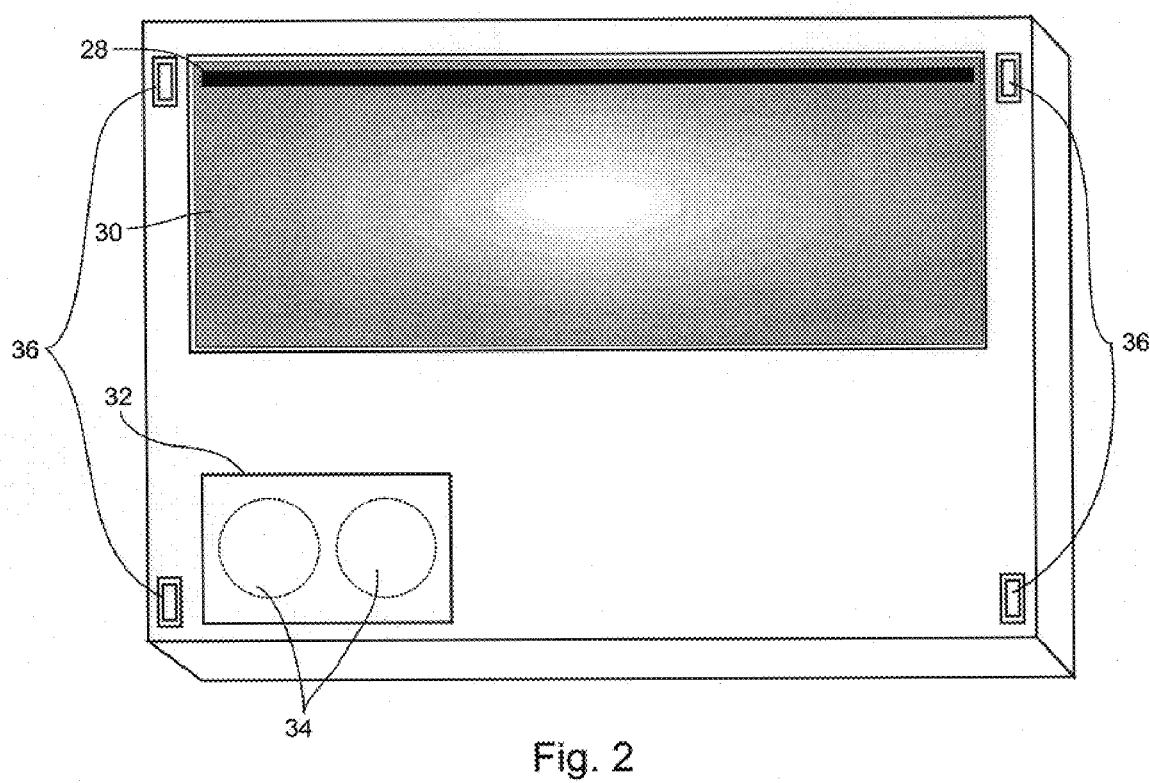
FIG. 2 is a diagram of the lower surface of the device according to the present invention.

FIG. 2 is a diagram of a lower portion of the device of the present invention. Each corner of the lower surface preferably features a small roller 36, in order to make moving the device easier for the scanning process. At least one of these rollers 36 is also preferably wired with an electro mechanical sensor which enables the device to sense such movement. Rollers 36 preferably protrude a minimal distance away from the device to allow for ease of movement of the device in a vertical direction over the scanned reading material. A scanning window 28 is moved over the scanned reading material, in order for the scanner components (described in greater detail below) to scan this material.

FIG. 2 also shows a battery component cover 32 for covering at least one internal battery 170 for providing power to the device, of which two are shown without any intention of being limiting. Batteries 34 are preferably rechargeable, more preferably by the previously described external power source.

Figure 3:
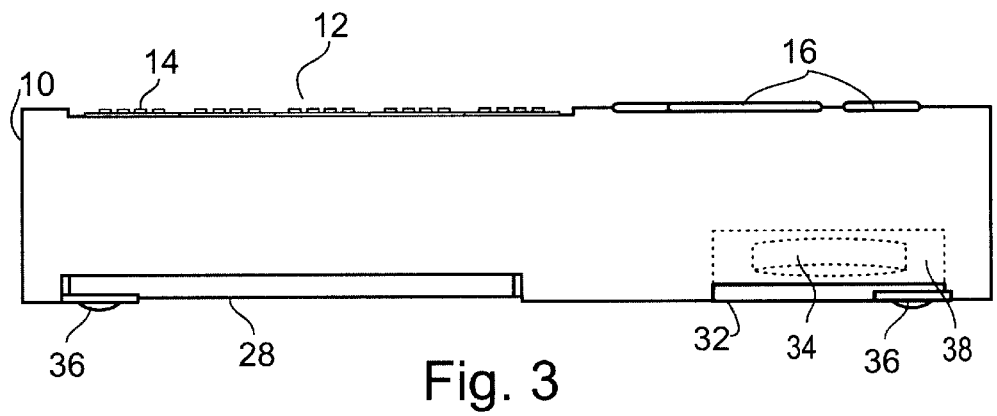
FIG. 3 is a diagram of a side view of the device according to the present invention.

FIG. 3 is a side view of the device according to the present invention, in which Braille array 12 and Braille keyboard 16 are shown in profile. In addition, scanning window 28 is also shown in profile.

Figure 4:
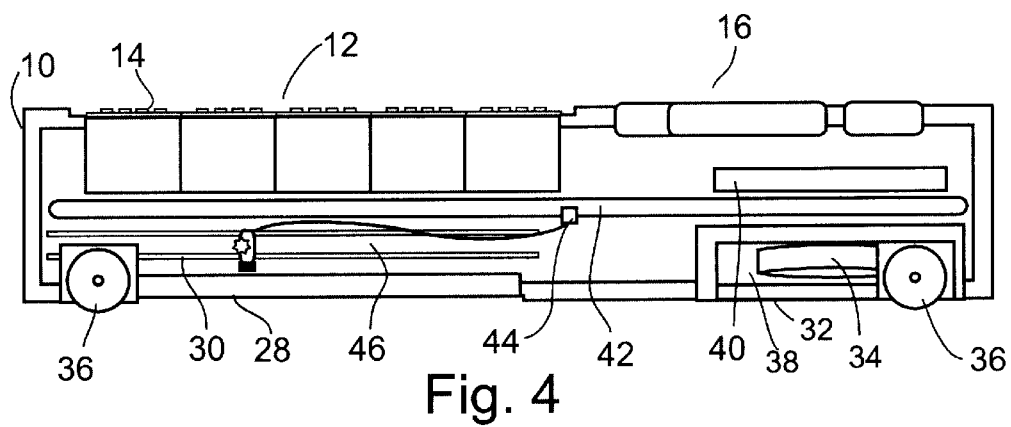
FIG. 4 is a diagram of a cut-away view of the side of the device of FIG. 3 according to the present invention.

FIG. 4 shows the device in a cut-away view, showing the internal components of the device. As shown, Braille array 12 features a plurality of Braille cells 14. Braille cells 14 are preferably in communication with an integrated circuit board 42, which features a micro-controller 40 as previously described. Micro-controller 40 is in communication with memory components for storing the software instructions for operating the device, including for performing the scanning process as described in greater detail below.

Circuit board 42 is also in communication with a scanner governing mechanism 44. Scanner governing mechanism 44 receives power from the previously described power source, which governs the movement of a scanning bar 30, such that scanning bar 30 is allowed to move back and forth in a plane parallel to the lower surface of the device and at a small distance above this surface. The movement of scanning bar 30 is more preferably limited by a twin gear rail 46. The direction of movement while scanning is preferably from the top of the device downward. Scanning bar 30, together with the scanning elements (not shown) attached to scanning bar 30, form a scanning head. Such a scanning head is described in U.S. Pat. No. 4,707,747, for example.

Scanning window 28 is preferably transparent with a minimal refraction index. Moving scanning bar 30 from the top to bottom limits the range of movement of scanning bar 30 over scanning window 28, such that a digital image of the reading material placed under the device is acquired. This image is then preferably stored in a first memory element.

Figure 5:
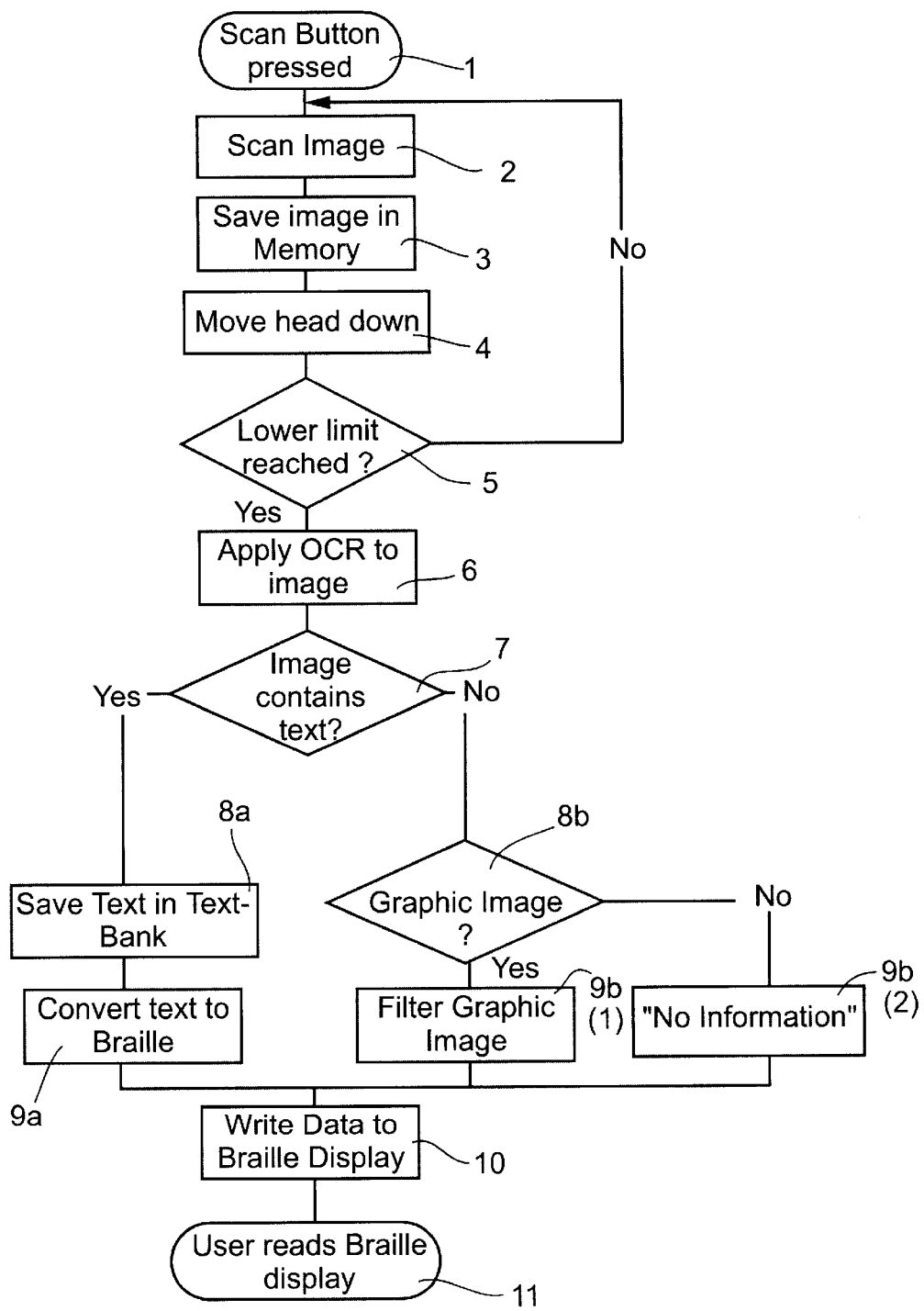
FIG. 5 is a flowchart of an exemplary method for scanning printed material with the device according to the present invention.

With reference now to FIG. 5 (a flowchart of an illustrative scanning method according to the present invention), the scanning process, including the process of image collection, is preferably initiated when the user presses a dedicated button on the device, as shown in step 1 of FIG. 5. The process of image collection is preferably complete when the scanning bar reaches the lower end of the range of movement, as shown in step 5 of FIG. 5. Preferably, the process of image collection is not initiated if the device detects movement through sensors in the rollers.

With regard to the process of image collection, as shown in step 2, the portion of the printed material available through the scanner window is scanned. In step 3, the resultant digital data is saved in memory. The scanning head is then moved down in step 4, and steps 2 and 3 are repeated until the lower limit is reached in step 5.

In step 6, the process of OCR (optical character recognition) is applied to the digital data. This process is preferably performed by OCR software, which determines if the image contains text, derives this text and identifies the printed character language in which the text is written. More preferably, the software uses an internal dictionary to examine the derived text, in order to verify that the text was identified correctly. Such OCR software is commercially available and could easily be installed by one of ordinary skill in the art.

In the process of OCR, the data is first examined to determine if text is featured, as shown in step 7. If text is found, then the text is derived from the digital data and preferably stored in a non-volatile memory component such as a flash memory device, as shown in step 8a. More preferably, the text is collected and stored for a period of time, including for example previous texts that the user specifically requested be saved in memory.

According to a preferred embodiment of the present invention, the stored texts are optionally and preferably dated, for cyclical deletion from the memory when the memory becomes full. The user is preferably able, through the control operations, to manually delete specific texts, in order to free memory, and thus to prevent the cyclic deletion. Alternately the user can optionally and preferably manually request to permanently retain a specific text, so that it is not automatically be cyclically deleted, but is retained until manual deletion by the user. The textual information is preferably always saved as full text, to enable easy transformation of the text to any desired form of Braille at a later time, or to download the text to an external computer, for optional viewing by sighted individuals.

In step 9a, the derived text is converted into the corresponding Braille elements. The conversion process involves adding special character for capital letters and numbers, and converting common words into Braille contractions. These steps are preferably performed with conversion tables or other forms of computerized dictionaries. The grade of Braille which is used to display the text, and thus the level of contraction performed on the text, is preferably controllable by the user through the control keys.

Alternatively, in step 8b, if the OCR shows that the acquired digital image contains non-textual information (such as a photograph, drawing or diagram), then a different process is performed. In step 9b(1), the image of the non-textual information is processed by a digital filter for converting the image into a line drawing. The digital filter optionally and preferably converts the image into a line drawing by increasing the contrast between the dark and light areas, or by using other known algorithms used to define outlines in images, and producing tactile graphics. This filter is more preferably modified to make best use of the uneven distribution of the dots in the grid of Braille cells described below. Such a line drawing can then be displayed using a portion of the Braille array, or even the entirety of the Braille array, as described in greater detail below with regard to step 11.

Alternatively, in step 9b(2), if an image is not detected, then no information is found and the process ends.

In step 10, any information which has been obtained is written to the Braille display, according to the instructions stored in non-volatile memory and interpreted by the microcontroller.

In step 11, the user reads the Braille array. Preferably, if images are to be displayed, one or more of the Braille cell(s) of the array, more preferably at one side or one corner of the array, contain a symbol identifying the displayed contents as image (and not text).

Figure 6:
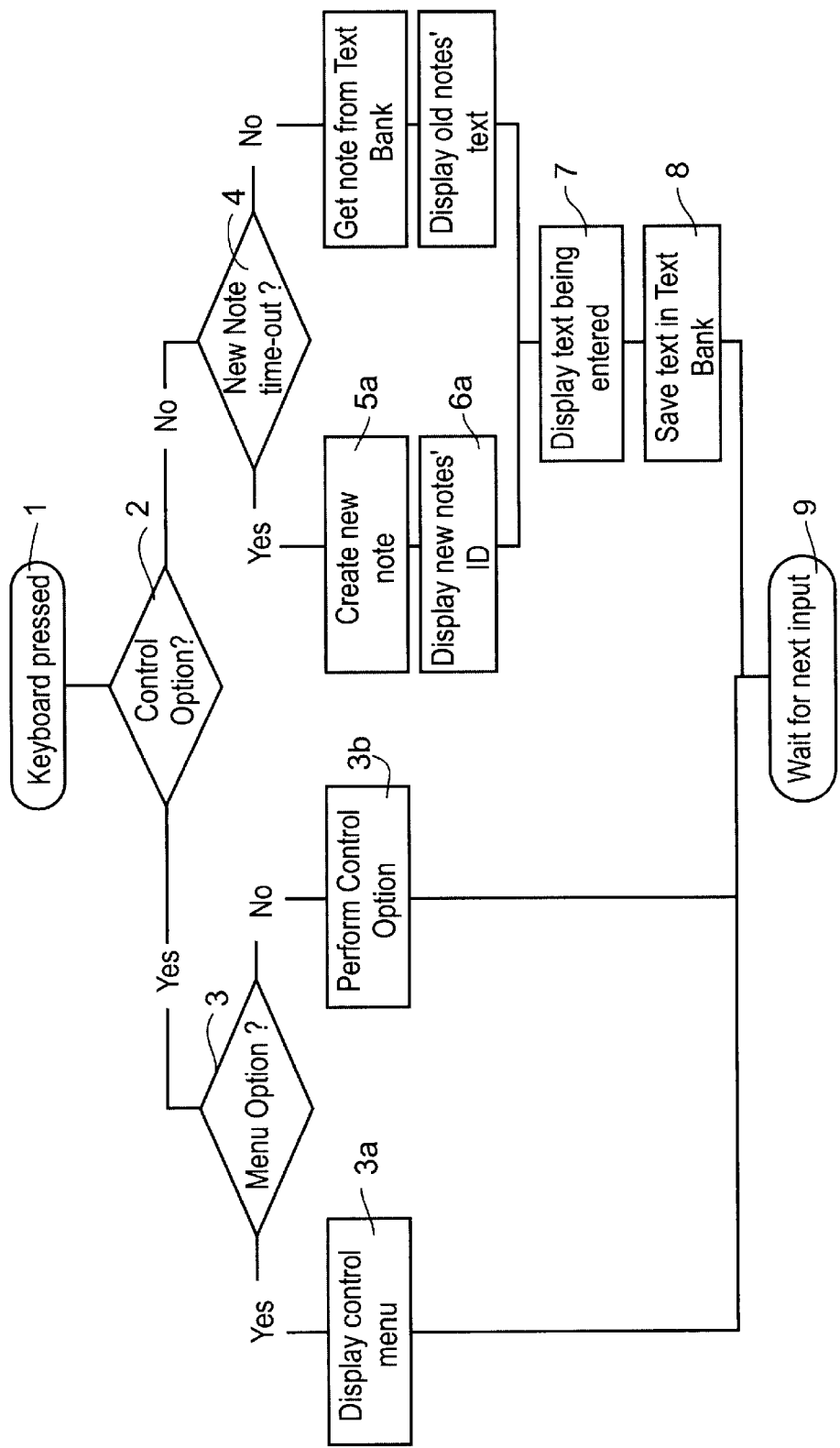
FIG. 6 is a flowchart of an exemplary method for taking notes with the device according to the present invention.

As shown with regard to FIG. 6, an annotation process is as follows. In step 1, the key or keys on the keyboard are pressed to invoke one or more options. In step 2, if the control option is invoked from these keystrokes, then either a menu option is displayed (in step 3a) or a control option is performed (in step 3b).

Turning now to the right branch of the flowchart, alternatively if the control option is not invoked, then in step 4 the request is analyzed to determine if a new note is to be written.

If so, then in step 5a, a new annotation or note is created. In step 6a, the identifier for the new note is preferably displayed. More preferably, text which the user enters automatically receives an identifier which is composed of the current date and time, and a serial number for that day, or an equivalent identifying system. This identifier preferably automatically appears on the first line of the Braille display, and the text the user is entering then appears on the next line. When the text entered is longer than the display area, the text is scrolled for display. Whenever a textual annotation is entered, a reference to the currently displayed text is preferably kept with the annotation. This link is marked by special symbol(s) at the end of the note. The user then has the option to remove the reference or to change it to refer to some other text.

Alternatively, if a previously written note or annotation is to be displayed, then in step 5b, the note is preferably retrieved from memory storage and is displayed in step 6b. More preferably, whenever the user types text on the keyboard, this text is stored in memory, forming a text-bank, as shown in step 8 below. The user is preferably able to mark the text as a new note, or as a continuation of previously entered text for example by using the control keys. Additionally the user can also add a reference link between the note and the currently viewed text. The existence of such a link is preferably indicated with a special symbol(s) next to the identifier for the notes, on the first line of the note. The user is preferably also able to associate a title and a number of key-words with the note to help find the specific note at a later time.

If the user does not specify that the new text is a new note, the text is more preferably automatically be added to the end of the previous note, unless a predefined period of time has passed since the user last stopped typing. The user is preferably also able to modify the length of this time period, using the control options.

In step 7, the text being entered is preferably displayed on the Braille array. In step 8, the text is preferably saved in memory. The user is preferably able to search through all of the stored text, using the control options. Searches are more preferably allowed using the actual text, note-titles and key words.

According to other preferred features of the present invention, there are provided a number of additional components, which enable the device of the present invention to provide a complete information management system for blind individuals. These components preferably include an organizer component, which supplies the user with standard organizer capabilities, including a calendar appointment book, and a phone and address book. This component is preferably integrated with the note taking and text bank components, allowing the user to link texts and notes to specific events or people.

Another preferred component is a management component, which provides integrated control of all of the above mentioned software components, and all of the hardware, making the device a cohesive whole. The management component is also the software component which preferably handles the external interfaces described below, and general features, such as the software update, which are not specific to any one component.

An external communicator software module preferably provides control of the device for the user through the external interface of the device, including all of the control operations available directly through the control-keys. This external software module is preferably operated by a separate computer, such as a desktop computer for example. This module also preferably enables the user to perform additional management features of the device text bank. These features allow the user to control exactly what texts are present in the device memory. The two main features of this type preferably include uploading or downloading textual information to and from the device to the application.

Downloading all or specific information that the device stores, such as the scanned texts, annotations or organizer related information, enables this information to be transmitted from the device to an external device. After transfer to the external device, such as a desktop computer for example, this information is preferably stored on a storage medium, such as floppy diskettes, hard disks or writable CD-ROM disks. By downloading texts from the device, the user is preferably able to ensure that texts to be saved for future use are not be lost, but also do not monopolize the limited memory resources of the device.

Various types of information may optionally be uploaded into the device, such as computerized texts to read, or organizer related information created using this application or imported to it from other standard office applications. This feature preferably allows users of the device to take computerized materials with them, and to update their appointment books or address books from external sources used by sighted people. This feature allows such users easy integration with sighted people, and gives the device full organizational capabilities.

These upload and download features are especially useful for blind students who are integrated in sighted educational systems. These students could therefore easily access computerized study materials, read, and perform assignments that are textual, while doing all of the actual work in Braille.

The application also preferably allows the user to change the version of the embedded software components in the device. The application obtains updated versions for this purpose from standard types of storage media or from Internet servers dedicated to this purpose. The embedded software is more preferably able to change itself using a standard bootstrap loading mechanism.

This application (or an additional related application) allows the application user to control exactly what is on the display screen of one or more device using a keyboard, Braille keyboard or previously entered texts. This feature is highly useful for teaching the Braille alphabet, for example.

It will be appreciated that the above descriptions are intended only to serve as examples, and that many other embodiments are possible within the spirit and the scope of the present invention.

What is claimed is:

1. A portable device for information management for a blind individual, comprising:
 (a) a scanner for scanning a printed character material and for producing digital data, said scanner comprising:
  (i) a scanning window for being moved over said printed character material; and
  (ii) a scanning bar for scanning said printed character material through said scanning window, such that an area of said printed character material being available for scanning by said scanning bar is determined by said scanning window;
 (b) an OCR (optical character recognition) software module for analyzing said digital data to determine if said printed character material contains text, and if said text is present, converting at least a portion of said digital data into Braille writing;
 (c) a Braille array, comprising a plurality of Braille cells, for displaying said Braille writing; and
 (d) a management software module for producing Braille writing for providing an information management selection interface to the blind individual, said information management selection interface being displayed on said Braille array, and said information management selection interface including at least one option for scanning said printed material.

2. The portable device of claim 1, further comprising:
 (e) a Braille keyboard for receiving input from the blind individual, including selecting said at least one option of said information management selection interface.

3. The portable device of claim 2, further comprising:
 (f) a memory module for storing at least one scanned text, such that said at least one scanned text is retrieved from said memory module and displayed on said Braille array.

4. The portable device of claim 3, wherein said Braille keyboard includes at least one cursor key for manipulating said retrieved and displayed text.

5. The portable device of claim 3, wherein said OCR software module further analyzes said digital data to determine if at least one graphical image is present in said printed character material, said at least one graphical image being displayed on said Braille array.

6. The portable device of claim 5, wherein said software modules, said Braille keyboard, said memory module, said scanner and said Braille array are incorporated in a single physical case.

7. The portable device of claim 3, wherein said management module further includes at least one function for receiving an annotation input to said scanned text through said Braille keyboard, and for displaying said annotation on said Braille array.

8. The portable device of claim 7, further comprising:
   (g) an organizer component including at least one of a calendar appointment book and a phone and address book.

9. The portable device of claim 8, wherein at least one entry in said organizer component is annotated by said annotation input.

10. The portable device of claim 9, wherein at least one entry in said organizer component is linked to said scanned text in said memory module.

11. The portable device of claim 7, further comprising:
   (g) an external interface for transmitting information from the device and for receiving information to the device; and
   (h) an external communicator software module for controlling said external interface.

12. The portable device of claim 7, further comprising:
   (g) a micro-controller for operating at least said OCR software module and said management software module, and for controlling each Braille cell; and
   (i) a memory buffer controlled by said micro-controller, such that each Braille cell is mapped directly to a fixed address in said memory buffer, and such that said micro-controller writes each value to be displayed to said fixed address.

13. The device of claim 1, wherein said scanner further comprises:
   (iii) a scanner governing mechanism for governing a movement of said scanning bar, such that said scanning bar is allowed to move in a plane parallel to a lower surface of the device.

14. The device of claim 13, wherein said scanner further comprises:
   (iv) a twin gear rail for limiting movement of said scanning bar.

15. The device of claim 13, further comprising:
   (e) at least one sensor for sensing movement of the device, such that said scanning bar is operable only when said movement is not sensed.

16. The device of claim 1, wherein said scanning window is transparent with a minimal refraction index.

* * * * *